United States Patent [19]

Loubiere

[11] 4,443,039
[45] Apr. 17, 1984

[54] TRAILER WHEEL ADAPTABLE TO AUTOMOBILE HUBS

[76] Inventor: David L. Loubiere, P.O. Box 363, Addis, La. 70710

[21] Appl. No.: 543,234

[22] Filed: Oct. 21, 1983

Related U.S. Application Data

[63] Continuation of Ser. No. 371,452, Apr. 23, 1982, abandoned, which is a continuation of Ser. No. 153,460, May 27, 1980, abandoned.

[51] Int. Cl.³ .............................................. B60B 1/06
[52] U.S. Cl. .................................. 301/64 SD; 301/66; 301/12 R
[58] Field of Search ................ 301/90 N, 11 R, 10 R, 301/12 R, 24, 25, 63 R, 63 D, 64 R, 64 SD, 65, 66; D12/204, 207

[56] References Cited

U.S. PATENT DOCUMENTS

| 1,578,746 | 3/1926 | Mijnssen et al. | 301/12 R |
| 2,000,877 | 5/1935 | Brink | 301/12 R |
| 3,394,966 | 7/1968 | Mitchell | 301/12 R |

Primary Examiner—H. Grant Skaggs
Attorney, Agent, or Firm—David L. Ray

[57] ABSTRACT

A wheel structure adaptable for use on a trailer or an automobile hub including a spoked member having at least three spokes, each of the spokes being adapted to contact a rim on which a rubber tire may be mounted, the spoked member having a series of outer bolt holes corresponding to the number of spokes, the spoked member having a series of inner lug bolt holes for receipt of the lug bolts attached in an automobile or other hub and a hole centered in the wheel structure for receipt of an axle or other protuberance from the automobile hub.

1 Claim, 3 Drawing Figures

U.S. Patent  Apr. 17, 1984  4,443,039
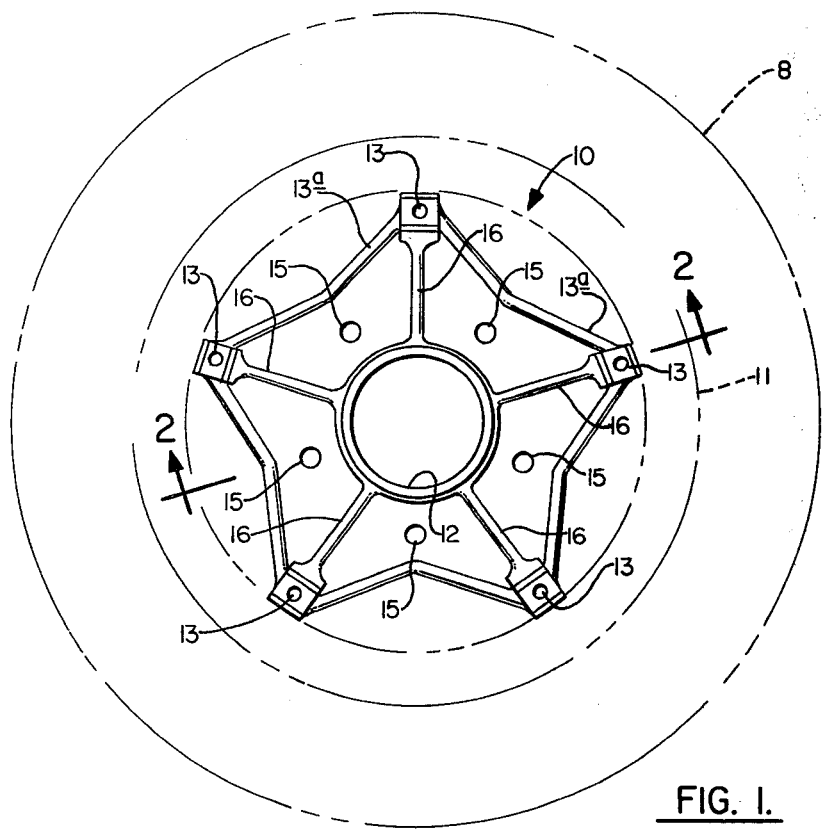
FIG. 1.
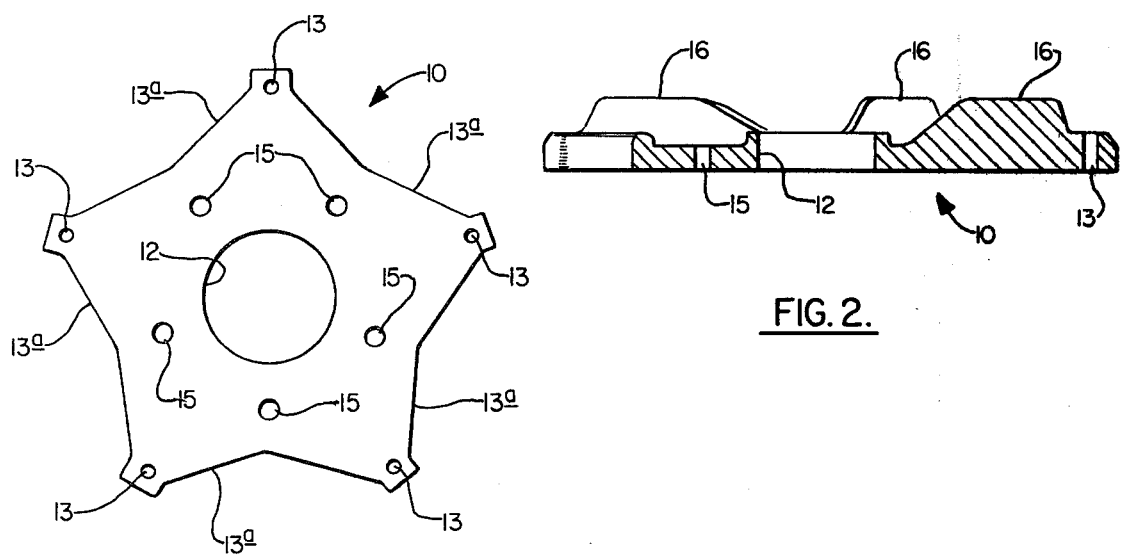
FIG. 3.
FIG. 2.

ved again. Such trailers may have as many as six, eight or more wheels connected thereto. Thus, if the trailer is never moved, these tires and wheels can never be utilized again. The trailer wheels as commonly designed cannot be fitted to any other vehicle.

It is an object of the present invention to provide a wheel which is adaptable to be used on a vehicle such as an automobile or on a trailer and on which may be mounted the tires and rims used on a house trailer. It is a further object of this invention to provide an improved wheel which is easily adapted to use on a wide variety of vehicle hubs.

SUMMARY OF THE INVENTION

A wheel structure adaptable for use on a trailer or automobile hub including a spoked member having at least three spokes, each being adapted to contact a rim on which a rubber tire may be mounted, the spoked member having a series of outer bolt holes corresponding to the number of spokes, the spoked member having a series of inner lug bolt holes for receipt of lug bolts attached to an automobile or trailer hub and a hole centered in the wheel structure for receipt of an axle or other protuberance from the automobile hub.

The present invention will result in large energy savings because tires which were formerly allowed to dry rot or go unused can now be utilized on various vehicles, thus decreasing the number of tires needed in the United States with a resultant savings in petroleum from which the tires are made. Furthermore, the present invention results in great economic savings to persons purchasing house trailers.

BRIEF DESCRIPTION OF THE DRAWINGS

FIG. 1 is a side plan view showing the wheel structure of the present invention with a rim and tire "ghosted" thereon;

FIG. 2 is a cross-sectional view taken along lines 2—2 of FIG. 1; and

FIG. 3 is a rear view of the wheel structure of FIG. 1.

DESCRIPTION OF THE PREFERRED EMBODIMENTS

Referring now to FIGS. 1-3, the wheel structure of the present invention is generally indicated by the numeral 10. As shown in FIG. 1, wheel structure 10, when utilized on an automobile or other vehicle, has a rim 11 shown "ghosted" about wheel structure 10 on which is mounted a rubber tire 8 shown "ghosted" about rim 11 as is well known to those skilled in the art.

The novel wheel structure shown in the drawings has a series of holes 15 therein for receipt of lugs or studs which extend from the hub of an automobile or trailer hub. A series of holes 13 are located at the end of spokes 13a. Spokes 13a contact the inner edge of rim 11. Rim 11 is held to spokes 13a by conventional means well known in the art which is attached through the use of bolts which are received in the holes 13. At the outer edge of spokes 13a is a raised rib of the outside thereof which aids in preventing cracks from occuring in the outer edge of spoke 13a as the wheel is placed under stress.

In the center of the wheel structure is a circular hole 12 for receipt of a bearing housing protruding from the hub of an automobile or trailer. On the conventional house trailer wheel there is a cylindrical bearing housing adjacent to and aligned with the circular hole 12. In the present invention there is no such housing.

In accordance with the present invention the holes 15 and the center hole 12 is formed in the wheel structure 10 by drilling or casting integrally with the structure when the wheel is made. The holes are a sufficient size and sufficient in number to fit the vehicle desired.

For example, the holes 15 may vary from three to up to five in number, or even more if desire, depending upon the particular vehicle to which the wheel is to be attached.

Furthermore, the spokes 13a may vary in number. Generally speaking, five are preferred but they may vary from three up to six or more in number if desired.

Although the preferred embodiments of the present invention have been disclosed and described in detail above, it should be understood that the invention is in no sense limited thereby and its scope is to be determined by that of the following claims.

What is claimed is:

1. A wheel structure for attaching a mobile home tire and rim to the existing lug bolts on an automobile hub comprising a wheel member consisting of:
  a. five spokes, each of which is adapted to contact a mobile home wheel rim on which a rubber tire may be mounted, said five spokes being integrally formed with said wheel and having an integrally formed web therebetween, the outer edge of the web being formed in the shape of a "V", the bottom of the "V" being pointed toward the center of the wheel said outer edge having a riased rib on the outside thereof,
  b. a series of five outer bolt holes, each one of said outer bolt holes being located on the end of one spoke, for receipt of means for holding said rim to said wheel structure;
  c. a series of five inner lug bolt holes for receipt of lug bolts attached to an automobile hub,
  d. a round hole centered in the wheel structure for receipt of an axle or other protuberance, said round hole having a raised rib therearound on the outside thereof, and
  e. five raised ribs on the outside of said five spokes, each of said ribs extending from the edge of said raised rib around said round hole to the edge of each of said outer holes, said five raised ribs having a width smaller than the diameter of said five inner lug holes.

* * * * *